United States Patent
Chamdani et al.

(12)

(10) Patent No.: US 6,487,715 B1
(45) Date of Patent: Nov. 26, 2002

(54) DYNAMIC CODE MOTION OPTIMIZATION AND PATH TRACING

(75) Inventors: Joseph I. Chamdani, Santa Clara, CA (US); Gary Lauterbach, Los Altos, CA (US); William Lynch, Woodside, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/293,076

(22) Filed: Apr. 16, 1999

(51) Int. Cl.⁷ .................................................. G06F 9/44
(52) U.S. Cl. ........................ 717/154; 717/135; 717/159; 717/161; 712/214; 712/219; 712/233
(58) Field of Search ................................. 717/151–156, 717/159–161, 141, 128, 135; 712/219, 237, 239, 233, 214, 204, 226, 236; 703/22, 13

(56) References Cited

U.S. PATENT DOCUMENTS

| | | | | |
|---|---|---|---|---|
| 5,119,498 A | * | 6/1992 | King .............................. | 717/9 |
| 5,133,072 A | * | 7/1992 | Buzbee .......................... | 717/9 |
| 5,450,588 A | * | 9/1995 | Hoxey ........................... | 717/9 |
| 5,712,791 A | | 1/1998 | Lauterbach ................... | 364/489 |
| 5,764,942 A | | 6/1998 | Kahle et al. .................. | 395/390 |
| 5,857,097 A | * | 1/1999 | Henzinger et al. ........... | 712/236 |
| 5,884,061 A | | 3/1999 | Hesson et al. ............... | 395/393 |
| 5,933,622 A | * | 8/1999 | Buzbee et al. ................ | 703/22 |
| 5,999,736 A | | 12/1999 | Gupta et al. ................. | 395/709 |
| 6,026,240 A | * | 2/2000 | Subramanian ................ | 717/9 |
| 6,044,221 A | * | 3/2000 | Gupta et al. .................. | 717/9 |
| 6,247,115 B1 | * | 6/2001 | Janik et al. ................... | 712/219 |
| 6,263,489 B1 | * | 7/2001 | Olsen et al. .................. | 717/4 |

FOREIGN PATENT DOCUMENTS

| EP | 0 442 623 A2 | 8/1991 | ............. G06F/9/45 |
|---|---|---|---|
| EP | 0 793 172 A2 | 9/1997 | ............. G06F/9/45 |
| EP | 0 810 523 A2 | 12/1997 | ............. G06F/9/45 |

OTHER PUBLICATIONS

Luk & Mowry, "Cooperative Prefetching: Compiler and Hardware Support for Effective Instruction Prefetching in Modern Processors," Proceedings of the 31st annual ACM/IEEE Int'l Symposium on Microarchitecture, Dallas, Texas USA, 1998, pp. 182–194.*

Rajiv Gupta, "Code Optimization as a Side Effect of Instruction Scheduling," IEEE 1997, pp. 370–377.*

Kennedy & Roth, "Context Optimization for SIMD Execution," IEEE Aug. 1994, pp. 445–453.*

T. Ball et al., "Efficient Path Profiling," *Proceedings of the 29th Annual IEEE/ACM International Symposium on Microarchitecture—MICRO–29*, Dec. 2–4, 1996, Paris France, pp. 46–57 (Dec. 1996).

G. Ammons et al., "Exploiting Hardware Performance Counters with Flow and Context Sensitive Profiling," *Proceedings of the 1997 ACM SIGPLAN, Conference on Programming, Language Design and Implementation (PLDI)*, vol. 32, No. 5, pp. 85–96 (Jun. 1997).

* cited by examiner

Primary Examiner—Tuan Q. Dam
(74) Attorney, Agent, or Firm—Townsend and Townsend and Crew LLP (57) ABSTRACT

A method of reordering instructions. Barrier instructions are determined. The method determines when a processor stall may occur, and hoists subsequent instructions to fill in the stall time. However, instructions are not hoisted above the barrier instructions. Barrier instructions include branch instructions, store and load instructions, and instructions which, if hoisted, cause the number of available registers to be exceeded. The method produces a reordered instruction trace and statistics regarding the effectiveness of the reordering.

17 Claims, 8 Drawing Sheets

DYNAMIC CODE MOTION OPTIMIZATION AND PATH TRACING

BACKGROUND OF THE INVENTION

This invention relates generally to computer software. More specifically, it relates to a method of scheduling instructions for efficient execution on a particular processor.

Generally, computer programmers write computer code in high-level programming languages to simplify various programming tasks. Compilers translate the high-level programs into a sequence of machine-readable instructions. The machine-readable instructions are collectively known as an instruction trace. The instruction trace is typically directed toward a particular processor. In the past, compilers generated the instructions for the instruction trace in the same order that the programmer specified them in the high-level program.

To improve the speed and efficiency of the processors, some modern processors have multiple pipelined execution units. Each pipelined execution unit has one or more stages, each stage performing a specific function that can be completed in a single clock cycle. The pipelined execution unit receives instructions at a first stage (i.e., stage one) and the instruction passes from stage one through each stage of the pipeline. At the end of the pipeline, execution of the instruction is complete. By this method, the efficiency of the processor is increased, because an instruction can be fed into the pipelined execution unit on each cycle, rather than waiting until the previous instruction is complete.

Pipelining is most efficient when the pipeline is kept full. If execution of an instruction is not begun on a particular clock cycle, the execution unit stalls. When an execution unit stalls, the efficiency of the processor goes down, since the pipelined execution unit has resources that are available, but not being used.

Execution unit stalls sometimes occur because of data dependancies. That is, an instruction may be dependent on the results of an instruction that has not yet completed. Modern compilers attempt to reduce execution unit stalls by executing instructions out of sequence. That is, instructions that are ready to be executed are placed in front of instructions that are not yet ready.

Another way that processor performance is increased is by speculative execution. Sometimes, the order of execution is not known until runtime. For example, many branch instructions are dependent on the results of previous calculations. The hardware makes predictions on how the branch instruction will be resolved and executes instructions speculatively based on the prediction. If the prediction was correct, the processor is ahead of where it would have been had it waited for the branch to be resolved. If it is not correct, then the system reverts back to where it would have been without the speculative execution.

Code Motion (also referred to as trace rescheduling) is one method used in optimizing programs for execution. A compiler reorders the instructions to decrease execution unit stalls. However, a limitation of currently available systems in executing instructions out-of-order is the compiler has limited knowledge of the effect of moving instructions ahead in the sequence. Sometimes, executing instruction speculatively is counterproductive since they cause additional overhead. For example, if instructions are moved ahead of a branch instruction and executed, and the prediction turns out to be wrong, the result is that unnecessary work was done and must be undone.

As users put more and more demands on gaining the most efficient use of their processors, it is important to find ways of compiling software for efficient execution by avoiding pipeline stalls. Consequently, there is a need for new and better ways of compiling instructions to a processor to allow for efficient operation.

SUMMARY OF THE INVENTION

The present invention provides a method of improving compiler use of code motion. The method uses a superscaler processor simulator to reorder instructions according to criteria established by the user. It generates statistics showing the effectiveness of particular reordering criteria. A user or compiler may use the statistics to determine the best reordering technique for a particular processor and software.

The method simulates a processor running a program and determines which instructions cause the processor to stall due to unavailability of resources or operands. It moves up ("hoists") execution of other instructions that are not stalled, so that they may begin execution during the processor stall. Barrier instructions are determined above which the instructions are not hoisted. Barrier instructions include branch instructions, store instruction (if load past store is disallowed), and instructions which will cause the number of registers needed to exceed a predetermined number. By not hoisting instructions above the barrier instructions, the method finds an efficient ordering of the instructions.

To easily correlate the reordered instruction trace to the source code, paths are identified in a unique and easily identifiable way. The paths are ranked according to different criteria such as the number of hoisted instructions or the number of path encounters. This produces useful examples of how paths can and should be optimized by a compilers code generator.

Further features of the invention, its nature and various advantages will be more apparent from the accompanying drawings and the following description of the specific embodiments.

DESCRIPTION OF THE SPECIFIC EMBODIMENTS

Figure 1A:
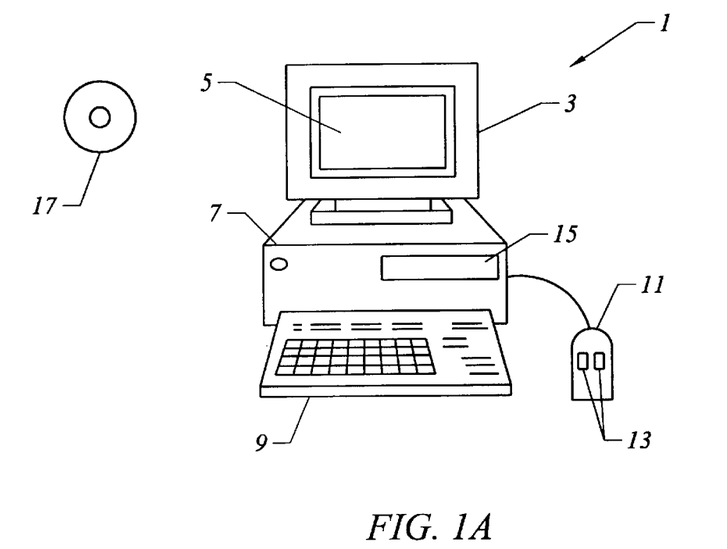
FIG. 1A illustrates a computer system upon which the present invention may be operated.

FIG. 1A illustrates an example of a computer system 1 that may be used to execute software embodiments of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CD-ROM drive 15 and a hard drive (not shown). These, or other storage devices may be used to store and retrieve software programs, including computer code incorporating the present invention. A CD-ROM 17 is shown as a computer readable medium for storing and distributing a software program of the present invention. However, other computer readable media including floppy disks, DRAM, hard drives, flash memory, tape, tape cartridges, and the like may be also be used. Cabinet 7 also houses familiar computer components (not shown) such as a processor, memory, and the like.

Figure 1B:
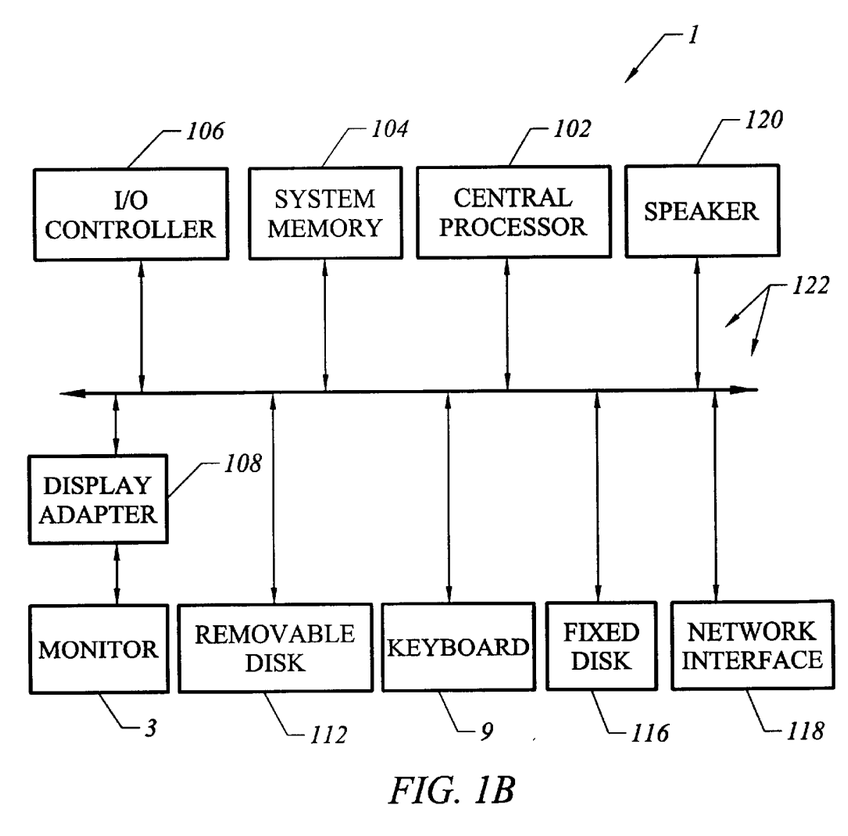
FIG. 1B is a block diagram of the computer system of FIG. 1A.

FIG. 1B shows a system block diagram of computer system 1 used to execute software embodiments of the present invention. Of course, this is only illustrative of many different computer architectures that may be used. As in FIG. 1A, computer system 1 includes monitor 3 and keyboard 9. Computer system 1 further includes subsystems such as a central processor 102, system memory 104, controller 106, display adapter 108, removable disk 112, fixed disk 116, network interface 118, and speaker 120. Removable disk 112 is representative of removable computer readable media like floppy disks, tape, tape cartridges, CD-ROM, removable hard drive, flash memory, and the like. Fixed disk 116 is representative of an internal hard drive or the like. Other computer systems suitable for use with the present invention may include additional or fewer subsystems. For example, another computer system could include more than one processor 102 (i.e., a multi-processor system) or memory cache.

Arrows such as 122 represent the system bus architecture of computer system 1. However, these arrows are illustrative of any interconnection scheme serving to link the subsystems. For example, display adapter 108 may be connected to central processor 102 through a local bus, or the system may include a memory cache. Computer system 1 shown in FIG. 1B is but an example of a computer system suitable for use with the present invention. Other configurations of subsystems suitable for use with the present invention will be readily apparent to one of ordinary skill in the art.

Figure 2:
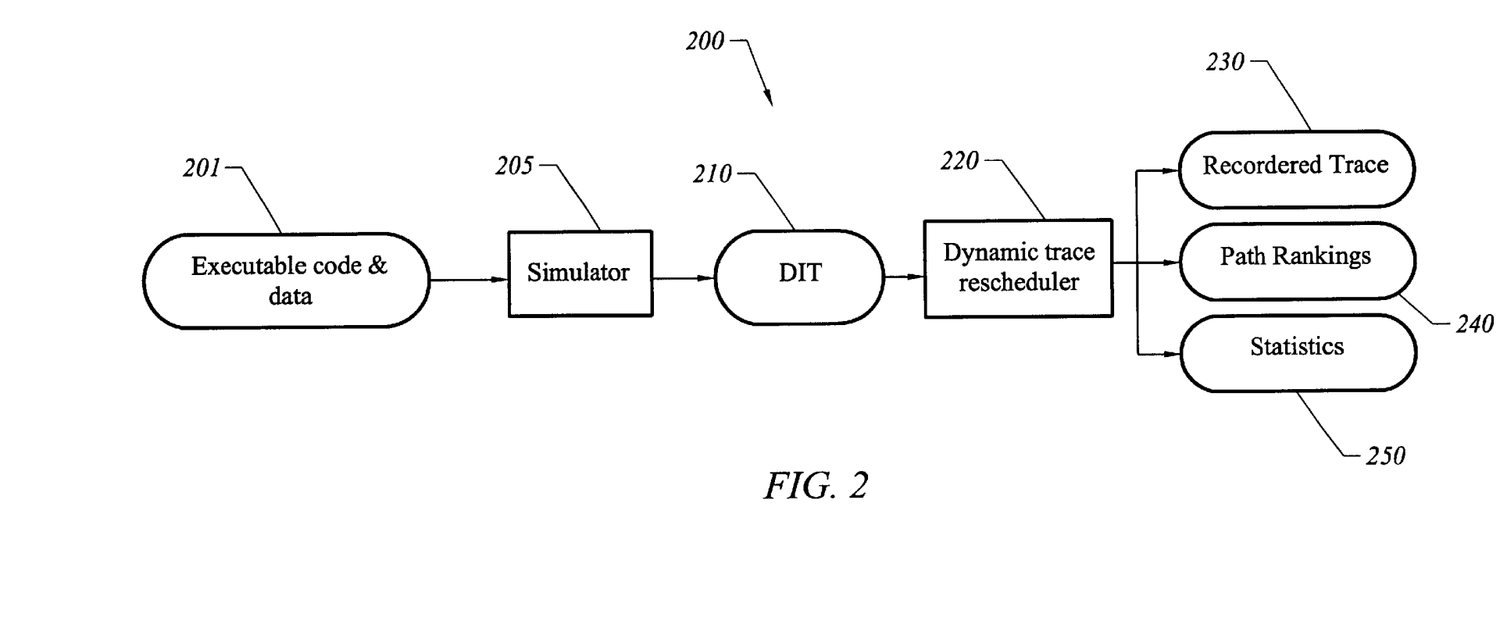
FIG. 2 is a high level flow diagram of software embodying the principles of the present invention.

FIG. 2 is a high level flow diagram of software 200 embodying the principles of the present invention. Software 200 accepts a program's executable code and data 201 as input, and outputs an out-of-order instruction trace 230, path rankings 240, and other statistics 250. Statistics 250 include information that is useful to a compiler for generating an efficient instruction trace for a particular processing unit. These inputs and outputs are representative of a specific embodiment. It will be recognized that other inputs and outputs may also be provided and generated without departing from the spirit of the present invention.

Executable code and data 201 are provided to a processor-specific simulation program 205. Executable code and data 201 may be a binary representation of a computer program generated by a compiler, along with the data used with the code. In the specific embodiment, executable code and data 201 is a memory image that includes machine-readable instructions and data. The instructions are generally in the order and include the structure provided by the programmer. That is, the instructions may include loops and other complex instructions.

Simulation program 205 simulates the execution of the executable code, and outputs a dynamic instruction trace ("DIT") 210. DIT 210 is a trace of the actual instructions that are provided to the execution units with the loops unrolled. Unrolling a loop means removing the loop and generating an individual set of instructions for each iteration of the loop. For example, an executable code loop may have the following commands.

loop: add
      sub
      setcc
      bcc loop
      ld If the loop executes three times, simulation program 205 would produce the following commands in DIT 210. The number in parentheses indicates which iteration of the loop corresponds with a given instruction. The numbers to the left are indicative of the sequence the instructions are provided. These items are shown for ease of description and understanding, and are not necessarily a part of DIT 210.

| t0 | add(1) |
|---|---|
| t1 | sub(1) |
| t2 | setcc(1) |
| t3 | bcc(1) |
| t4 | ld(1) |
| t5 | add(2) |
| t6 | sub(2) |
| t7 | setcc(2) |
| t8 | bcc(2) |
| t9 | ld(2) |
| t10 | add(3) |
| t11 | sub(3) |
| t12 | setcc(3) |
| t13 | bcc(3) |
| t14 | ld(3) |

Next, software 200 inputs DIT 210 to a dynamic trace rescheduler 220. Dynamic trace rescheduler 220 uses a set of reordering rules, defined by the user, to reorder DIT 210 and generate a reordered trace 230. This reordering is sometimes referred to as Code Motion, or dynamic trace rescheduling. Dynamic trace rescheduler 220 also generates path rankings 240 and other statistics 250 regarding the effect of the set of reordering rules on the program for the particular processor. A compiler (not shown) may use the path rankings 240 and statistics 250 to make decisions on how to reorder a particular program to produce the fewest number of execution unit stalls.

Preferably, DIT 210 is the input for dynamic trace rescheduler 220. However, many programs are very large. It is not uncommon to have DITs with 25–50 billion instructions. In such a case, it is not practically feasible to execute dynamic trace rescheduler 220 on the entire DIT 210. Consequently, a routine (not shown) may be executed to randomly choose short portions of DIT 210 known as snaps, thereby creating a shortened DIT. The shortened DIT is input to dynamic trace rescheduler 220 in place of DIT 210. For example, in a trace of 25 billion instruction, 400 snap points may be selected, each snap having 100 K instructions. Of course, these numbers can be varied as will be recognized by one of skill in the art to provide a good statistical analysis of the program. Throughout this document, it will be recognized that DIT 210 may be either the entire trace, or the shortened DIT as just described.

Dynamic trace rescheduler 220 receives DIT 210 and produces reordered trace 230. It does so by finding instructions that can be moved up in time (i.e., hoisted), without causing data dependency problems. The present invention introduces the idea of barriers. A barrier is a point in the executable code above which subsequent instructions cannot be hoisted. For example, if the third instruction is a barrier, and the fifth instruction is hoisted, it can only be hoisted as high as the fourth place; it cannot be hoisted above the third instruction. Different barrier points may be selected depending on the code motion mode/aggressiveness selected.

Different type of barriers may be defined for various reasons. Although other types of barriers may be envisioned by one of skill in the art, the specific embodiment defines the following types of barriers.

The first type is a branch barrier. Since there is uncertainty of what the next instruction may be, hoisting an instruction above a branch instruction may cause it to be executed unnecessarily. Therefore, branch instructions may be treated as barriers.

The way a branch barrier is defined may vary. for example, the definition may prohibit any branch from being crossed, or it may allow some types of branch instructions to not be classified as branch barriers. Generally, two types of branches exist, namely, conditional and unconditional. For conditional branches, the next instruction after the branch is not known until the variables it is conditional upon have been resolved. The variables may not be resolved until the conditional branch instruction is issued. Therefore, it is indeterminate what the next instruction may be. Unconditional branches are those which the next instruction is known, regardless of any variables.

The specific embodiment defines four types of branch barriers. The user may select which type of branches will be classified as branch barriers by selecting from these four types. Some branch barrier types allow certain branch instructions to be crossed, although none of the types allow mispredicted branches to be crossed.

The first type, as already discussed, is that no branch instruction can be crossed. That is, no instruction may be hoisted above a branch instruction. Therefore, all branch instruction are classified as branch barriers.

The second type of branch barrier allows one static branch (i.e., a branch that is known at compile time) to be crossed. In other words, instructions may be hoisted above the first static branch instruction, but no other branch instructions. Therefore, any occurrence of a non-static branch (i.e., a branch that is not known at compile time), the second instance of a static branch, or a branch that is mispredicted by the hardware or software is a branch barrier.

The third type of branch barrier allows multiple static branches to be crossed. That is, instruction may be hoisted above any static branch. Therefore, a mispredicted branch by the hardware or software, or any non-static branch is classified as a branch barrier.

Finally, the least restrictive type allows multiples of any type of branch to be crossed. In other words, an instruction may be hoisted above any branch instruction, unless it is mispredicted by the hardware or software. Therefore, only mispredicted dynamic branch instructions are classified as a branch barrier.

The next type of barrier is a store barrier. A store barrier is implemented if memory disambiguation is disallowed. Without memory disambiguation, many store and load addresses are not known and guaranteed not to collide at run-time. A store barrier blocks only load instructions and store instructions. That is, a load or store instruction cannot be hoisted above a previous store instruction. Other types of instructions may be freely hoisted past a store barrier.

The next type of barrier attempts to account for limits on the number of registers that may be allocated at a particular time. It is called a register pressure barrier. A count is maintained of the number of registers allocated at a given point in time and if hoisting an instruction will cause a predefined limit to be violated, then the instruction may not be hoisted. In the specific embodiment, the register limit is 32. However, in other embodiments this figure is dependent upon the resources available.

Other barriers include call-return instructions, jump instructions and save/restore instructions. These instructions cause an ambiguity in what the next instruction will be. Therefore, instructions that are hoisted above them may end up being executed unnecessarily.

The user of software 200 defines various barrier rules for trace rescheduler 220. Based on the barrier rules, trace rescheduler 220 reorders the instructions by hoisting some instructions above others and produces reordered trace 230. Trace rescheduler 220 searches for points in the program where execution unit stalls will occur, and hoists instructions that are not data dependent. In hoisting the instructions, the various barriers are not crossed. Trace rescheduler analyzes reordered trace 230 to develop path rankings 240 and statistics 250.

Path rankings 240 and statistics 250 are based on code segments of reordered trace 230 known as paths. A path is defined as a segment of code which ends at one of the barriers (the oldest/first to encounter). In some instances, the path will not encountered a barrier, but reaches a maximum number of instructions that can be recorded in a path. When the maximum number of instructions is reached, the start of the path is either the first instruction after a barrier instruction, or the first instance upon entering an empty instruction window. The path ends at a barrier, empty instruction window, or after the end of a fixed number of instructions whether a barrier is reached or not. In the preferred embodiment, the maximum number of instructions in a path is 1,024.

Each path is identified by a path ID. In the specific embodiment, the path ID is determined by the program counter value of the first instruction concatenated with a leading "1" and a branch pattern value representing the taken status of the branches. The branch pattern value is determined by looking at the branch instructions and placing a zero if the branch is not taken, and a one if the branch is taken. For example, a path starting at program counter value 8004C which has four branch instructions-the first of which it takes, the next two which it does not take, and a fourth which it does take-would be have a branch pattern value of 1001 (i.e., Hexadecimal 9) and consequently a path ID of Hex 190008004C.

Figure 3:
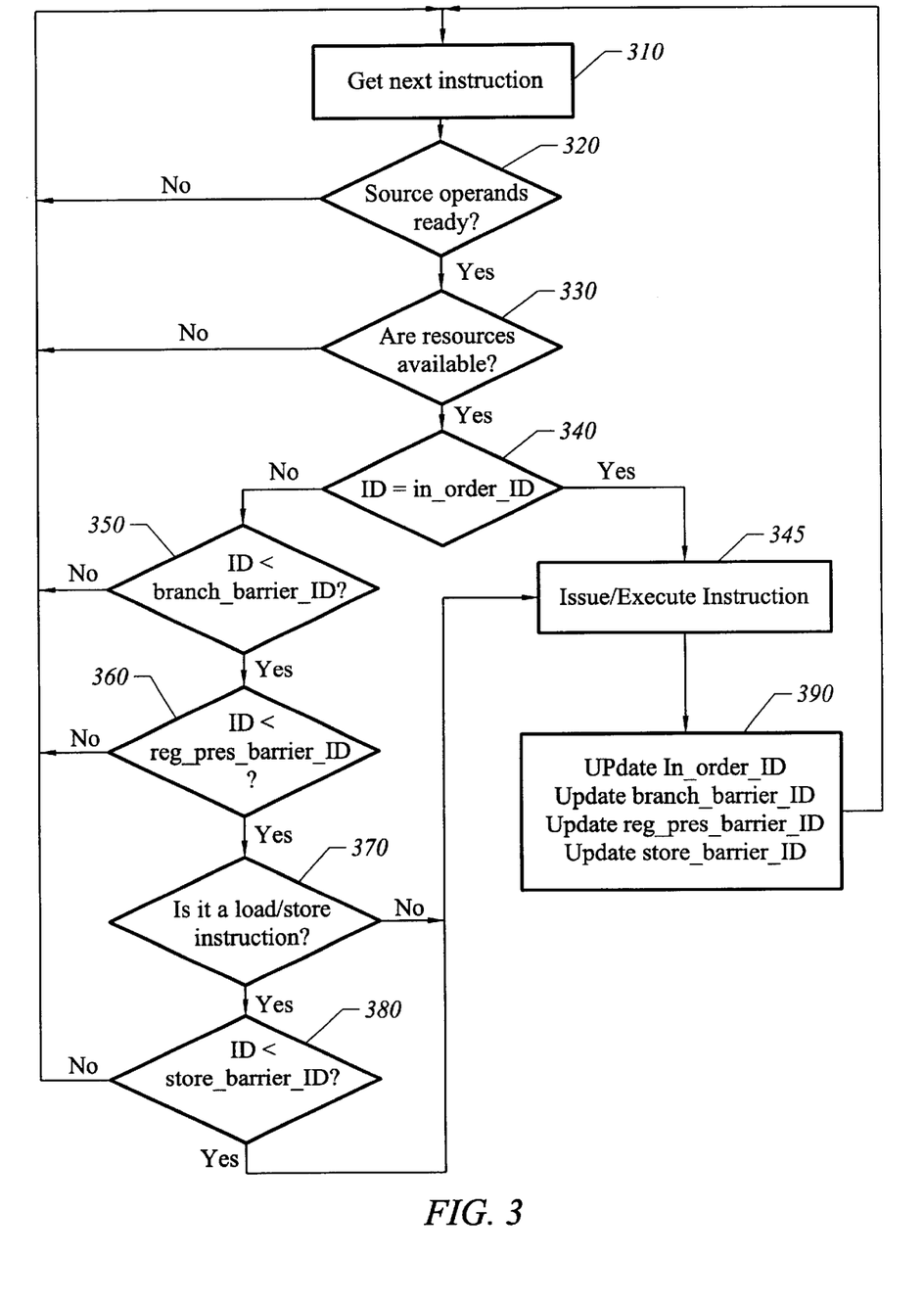
FIG. 3 is a flow diagram of the Code Motion portion of a dynamic trace rescheduler.

FIG. 3 is a flow diagram of the Code Motion portion of dynamic trace rescheduler 220. It performs the function of hoisting instructions according to the rules set up by the user. It operates by examining and first issuing each ready instruction in order. If the resources are still available, it will try to hoist the subsequent independent instructions.

In step 310, dynamic trace rescheduler 220 retrieves the next instruction from a pool of unissued instructions. Typically, the instructions are identified with an ID. The IDs are preferably in sequential order based on their original order in DIT 210. For example, the first instruction may have ID=1, the second instruction ID=2, etc. A variable, In_Order_ID, maintains the ID value of the next instruction that is to execute in order. For example, if instructions one, two, and four have executed, the next in order instruction is three, so In_Order_ID=3. Other variables include a Branch_Barrier_ID, a Reg_Pres_Barrier_ID, and a Store_Barrier_ID. The generation of these variables will be discussed below with respect to FIGS. 4, 5, and 6. Briefly, these variables give the IDs of the instructions that are the next in order Branch Barrier, Register Pressure Barrier, and Store Barrier, respectively.

In step 320, dynamic trace rescheduler 220 verifies that the operands (i.e., data) needed for the instruction are available. If they are available, then in step 330 it verifies whether the resources are available. If the conditions of step 320 or step 330 are not met, then dynamic trace rescheduler 220 returns to step 310 and chooses another instruction. Generally, it chooses the next sequential unissued instruction. If both conditions are met, then this instruction can be executed and dynamic trace rescheduler moves to step 340.

In step 340, the ID of the instruction to be executed is compared with the In_Order_ID variable. If they are equal, then the instruction is an in order execution and the system passes to step 345 where the instruction is issued to the execution unit and executed. This is done using a simulator that simulates the execution of a particular processor. If they are not equal then the instruction is an out-of-order execution and further processing is done to determine if it can be executed in this position, according to the rules.

If the instruction is an out-of-order execution then the next step is step 350. In step 350, the ID is compared with the Branch_Barrier_ID. If the ID is not less than the Branch_Barrier_ID, then it cannot be executed out of order at this time, since doing so would constitute hoisting the instruction above the branch barrier. In this case, the process returns to step 310 an, in to the next processor cycle, the same iteration is repeated. If it is less than the Branch_Barrier_ID, then it can be issued without hoisting above a branch barrier.

If it passes the test for branch barriers in step 350, then in step 360 a similar test in done with respect to the Reg_Pres_Barrier_ID. If the ID is not less than this variable, then the system returns to step 310 for the next cycle issuance, and if it is less than this variable then it will not violate the register pressure barrier and can be issued, assuming all the other tests pass.

The next test in step 370 is to determine if it is a load or a store instruction. If it is not, then the Store_Barrier_ID is irrelevant, because it only applies to load and store instructions. So, if it is not a load or a store instruction, then the instruction is issued out of order in step 345 as described above. If it is a load or a store instruction, the ID is compared with the Store_Barrier_ID variable and if it is not less than the Store_Barrier_ID, then it moves on to the next cycle's step 310. If it is less, then the instruction ID this issued and executed in step 345.

After issuing and executing the instruction, in step 390, the In_Order_ID, the Branch_Barrier_ID, the Reg_Pres_Barrier_ID, and the Store_Barrier_ID are updated as described below with respect to FIGS. 4, 5, and 6. The In_Order_ID is updated to be the next sequential unissued instruction. It will then loop back to step 310 to process the next sequential instruction.

Of course, it will be recognized by one of skill in the art, the order of checking the instruction ID against the various branch barrier IDs is not important. The order may be freely interchanged, or the comparisons may be done in parallel.

Figure 4:
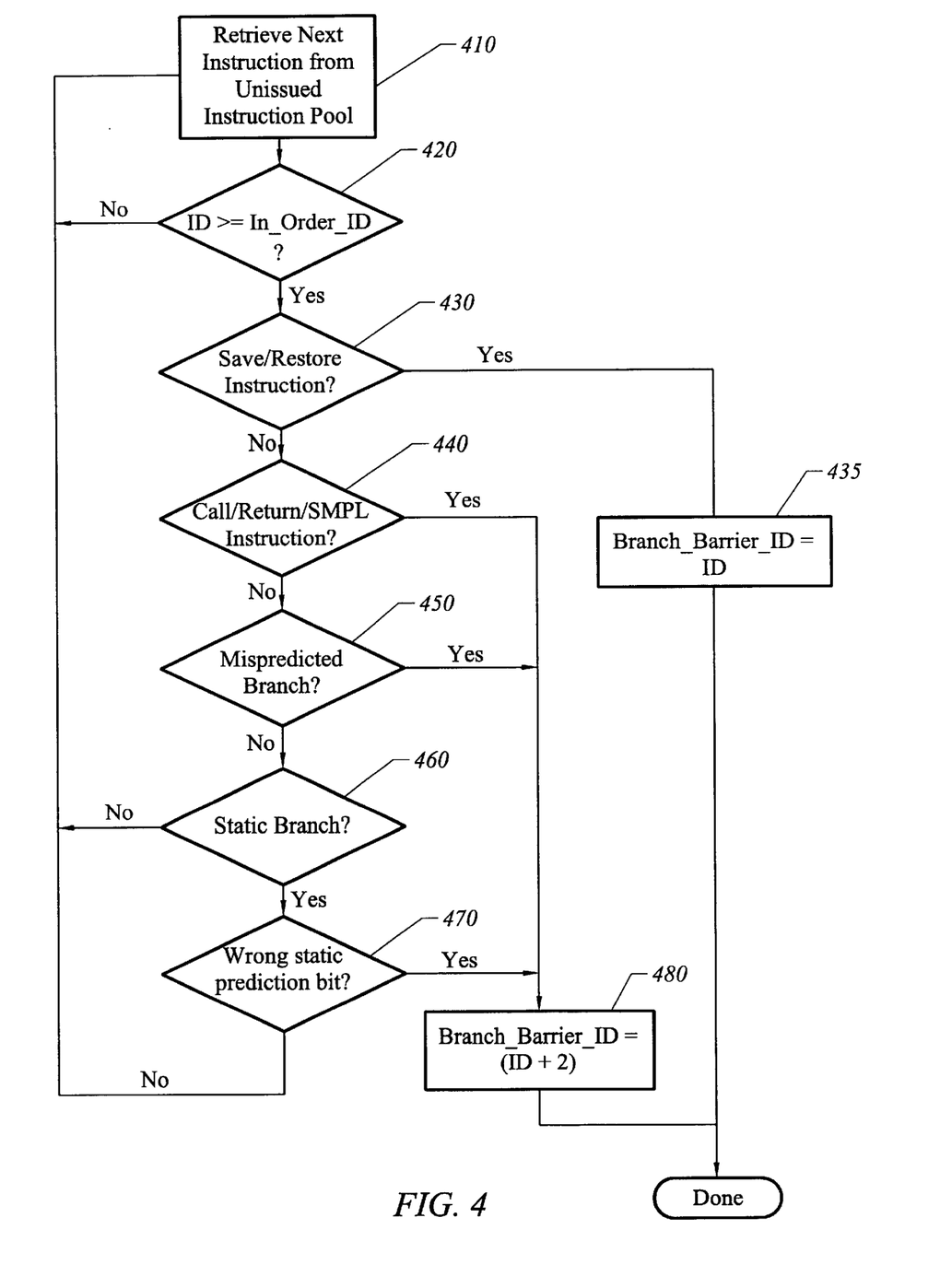
FIG. 4 is a flow diagram of a method of determining the next branch barrier.

FIG. 4 is a flow diagram of a method of updating the Branch_Barrier_ID. This is but one method of updating the Branch_Barrier_ID. One of skill in the art may accomplish the same thing by different methods, without departing from the spirit and scope of the present invention. The method may also change based on the particular application.

In step 410, the method retrieves the next unissued instruction from the instruction pool. This will generally be the instruction with the smallest ID. Next, in step 420 the ID of the retrieved instruction is compared with the In_Order_ID variable. If it is greater than or equal to the variable, then the instruction is not a branch barrier, and the next instruction is retrieved in step 410. If the ID is less than the In_Order_ID, then the instruction is analyzed by a series of tests to determine if it is a branch instruction.

In step 430, the first test determines if it is a save instruction or a restore instruction. If these types of instructions are treated as branch barriers, the save or restore instruction test in step 430 passes and in step 435 the Branch_Barrier_ID is set equal to the ID. Then the routine terminates since the new branch barrier has been found. If it is not a save or restore instruction, then the next tests are performed in steps 440–470. If the tests find a branch barrier, then the Branch_Barrier_ID is set equal to ID+2 in step 480. The routing then terminates since a branch barrier has been found. The branch barrier may be set higher than the ID (in the specific embodiment ID+2) to account for the branch delay slot instruction which is a common feature in RISC instruction set architectures.

Step 440 tests for a call, return, or JMPL instruction. These are unconditional branches. Other unconditional branches may be searched for here, as well. Step 450 tests for mispredicted branches by the hardware. If a branch is mispredicted, then it is not allowed to hoist instructions above it.

Step 460 tests for static branch instructions. In doing so, it takes into account the rules as set forth by the user. Depending upon the type of branch barrier set forth, some or all of the static branches may be classified as branch barriers. Finally, in step 470, the system tests the static prediction bit to determine if the software statically mispredicted the branch. If so then the instruction is a branch barrier.

If none of the tests determine that the instruction is a branch barrier, then the next instruction is retrieved in step 410 and it is tested. This continues until a branch barrier is found, or until no more instructions remain.

Figure 5:
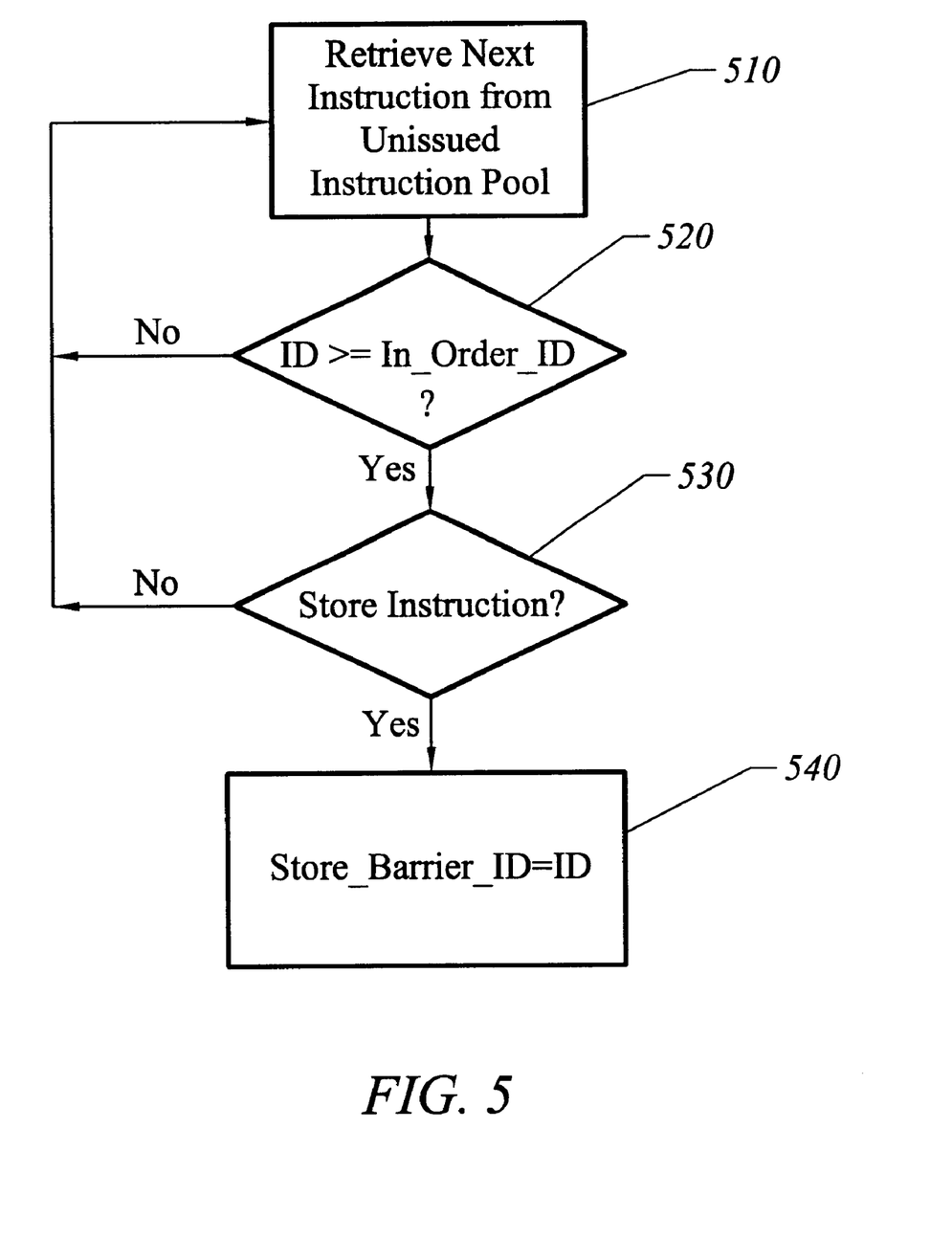
FIG. 5 is a flow diagram depicting a method of determining the next store barrier.

FIG. 5 is a flow diagram depicting a method of determining the next store barrier. In step 510, the next instruction from the unissued instruction pool is retrieved. The ID is compared with the In_Order_ID in step 520 to determine if it is an instruction that is newer than the current instruction. If it is not, then it cannot be a store barrier. If it is, then in step 530 the instruction is examined and if it is a store instruction, then the Store_Barrier_ID is set equal to the ID of the instruction in step 540. If it is not a store instruction, then the next instruction is retrieved in step 510.

Figure 6:
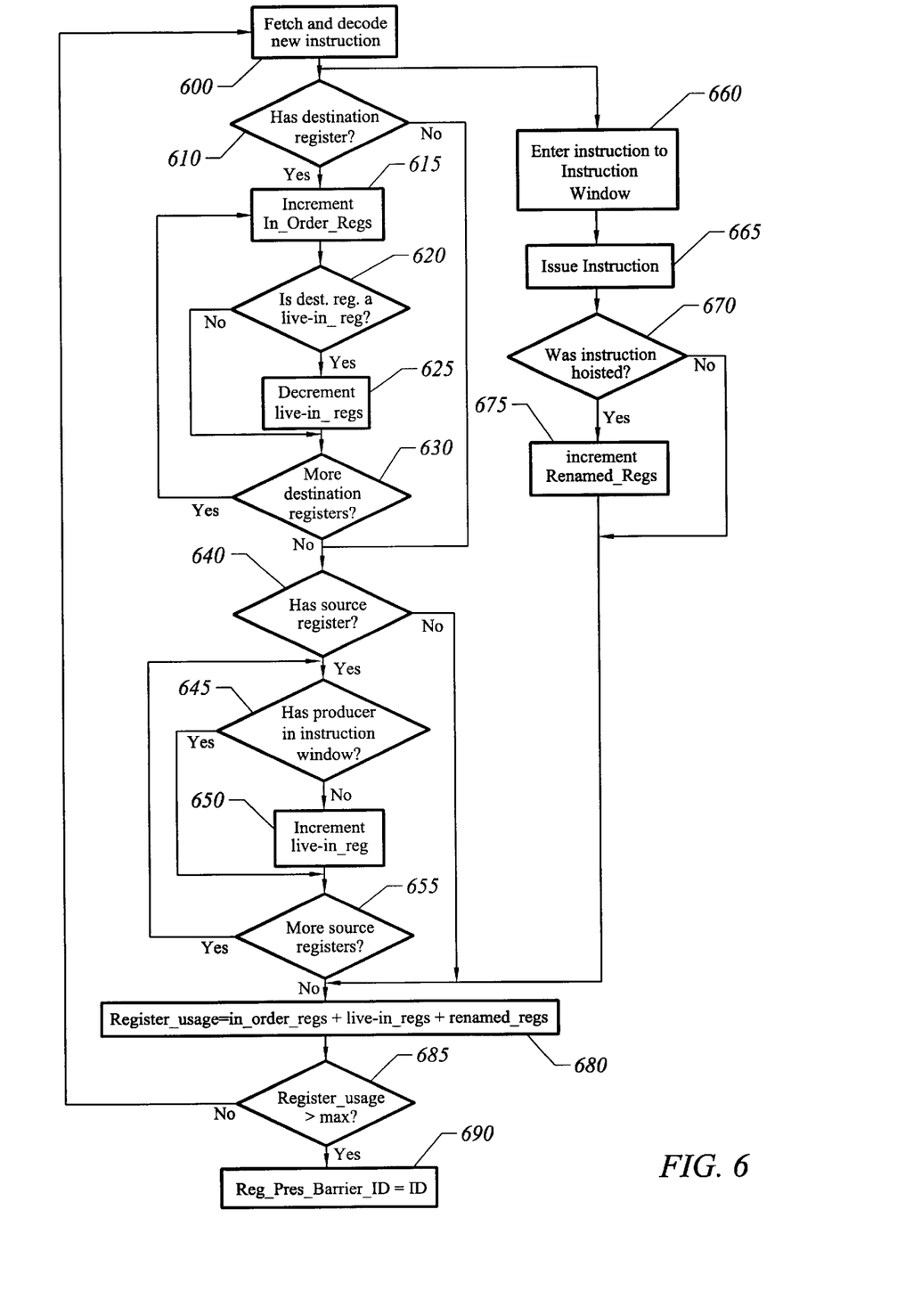
FIG. 6 is a flow diagram depicting a method of determining the next register pressure barrier.

FIG. 6 is a flow diagram depicting a method of determining the next register pressure barrier. Register pressure barriers are those instructions which, if hoisted, would cause the number of registers needed at a given time to be higher than the maximum number allowable. This is an effort to model the limitations in the compiler and actual processor hardware.

The specific embodiment defines three types of registers. In_Order_Regs are those destination registers that are needed for in-order operation. Live_In_Regs are those registers that have a valid value, but the producer of the value is not known. Dynamic trace rescheduler 320 maintains a window of instructions. The instruction window corresponds to the instruction paths discussed above. The determination of instruction paths will be discussed below with respect to FIG. 8. If the instruction that produces the register value is not within the window, then the register is a Live_In_Reg. Finally, Renamed_Regs are those registers that are called for by instructions that have been hoisted. Since they may use registers that are also used by 5 other instructions that were to be executed previously, a new register must be used until the previous instructions have been resolved. Hence, hoisted instruction cause the number of Renamed_Regs to increase.

FIG. 6 gives a method for calculating the register pressure barrier. In step 600, the method fetches and decodes a new instruction from the instruction pool. The instruction is examined to determine if it is an instruction that uses a destination register in step 610. A destination register is where the results of an instruction are put. For example, a load instruction loads a particular register. The register it loads is a destination register. Also, an add instruction adds two values to achieve a result. The result is placed in a destination register.

If the instruction uses a destination register, then the variable In_Order Regs is incremented in step 615. The value incremented since the instruction calls out a new destination register. Sometimes, this destination register is a register that has already been accounted for by a Live_In_ Reg. If so, the method determines this in step 625 and decrements Live_In_Regs since that register is now accounted for by In_Order_Regs.

If the instruction has more destination registers, then steps 615–630 are repeated for each of the destination registers. After the method accounts for all the destination registers, in step 640, it determines if there are any source registers. Source registers are those registers that contain instruction operands. For example, and add instruction adds two operands together to produce a result. The two operands may be in source registers. If there are source registers, then in step 645, the method determines if the producer of the source register is in the current instruction window. If so, then the register is already accounted for by an In_Order_Reg. However, if it is not, then the method increments Live_In_ Regs in step 650.

In step 655, the method determines if there are any other source register, and if so, then repeats steps 645–655. If not then the calculation of In_Order_Regs and Live_In_Regs is complete.

In parallel, with the above steps, the instruction is simulated. In step 660 the instruction is entered into the current instruction window, and issued to the simulator in step 665. Step 670 determines if the instruction was hoisted. If it was, then Renamed-Regs is incremented in step 675.

In step 680, all of the register variables, In_Order_Regs, Live_In_Regs, and Renamed_Regs are added together to determine the total number of registers at a given processor cycle. In step 685 this total is compared against the maximum register value established by the user. This number is typically hardware dependent. In the specific embodiment, the number is 32. If that current instruction would cause this to be greater than the maximum value, then the ID of the current instruction is logged as Reg_Pres_Barrier_ID and the routine terminates. If not, then the routine repeats for the next instruction.

Figure 7:
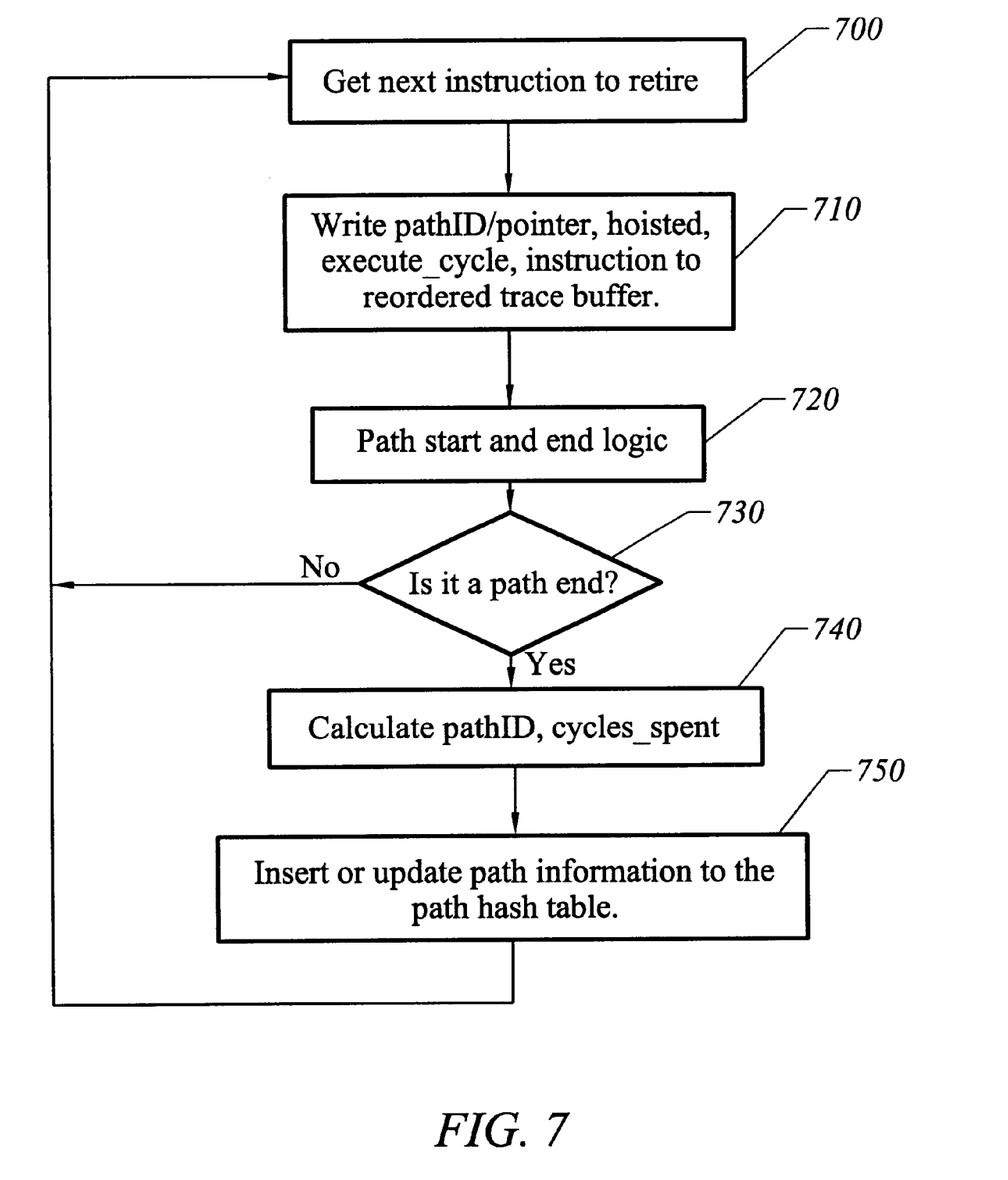
FIG. 7 is a flow diagram depicting a method of producing a reordered trace, path rankings, and other statistics.

FIG. 7 is a flow diagram of a technique to determine reordered trace 230, path rankings 240, and statistics 250. Paths are used in the generation of path rankings 240 and statistics 250. In the specific embodiment, this routine is executed on instructions that have been retired. A retired instruction is one which has been simulated and its execution is complete. Each cycle, those instructions that have completed their execution are retired.

In step 700, the technique retrieves the next instruction from a list of retired instructions. The instruction in the list with the lowest ID, and therefore the youngest instruction, is retrieved first.

In step 710, the technique writes the instruction to a buffer containing a list of previously retired instructions. This creates a list of instructions in the order they were executed using the hoisting rules. This list is reordered trace 230. Other information may also be preferably written to the buffer. The other information may include the path ID, whether the instruction was hoisted, or the cycle on which the instruction was executed. This information is useful in determining statistics 250.

Next, in step 720, a path routine is executed to determine into which path to put the retired instruction. A flow diagram of Path routine 720 is shown in FIG. 8.

Figure 8:
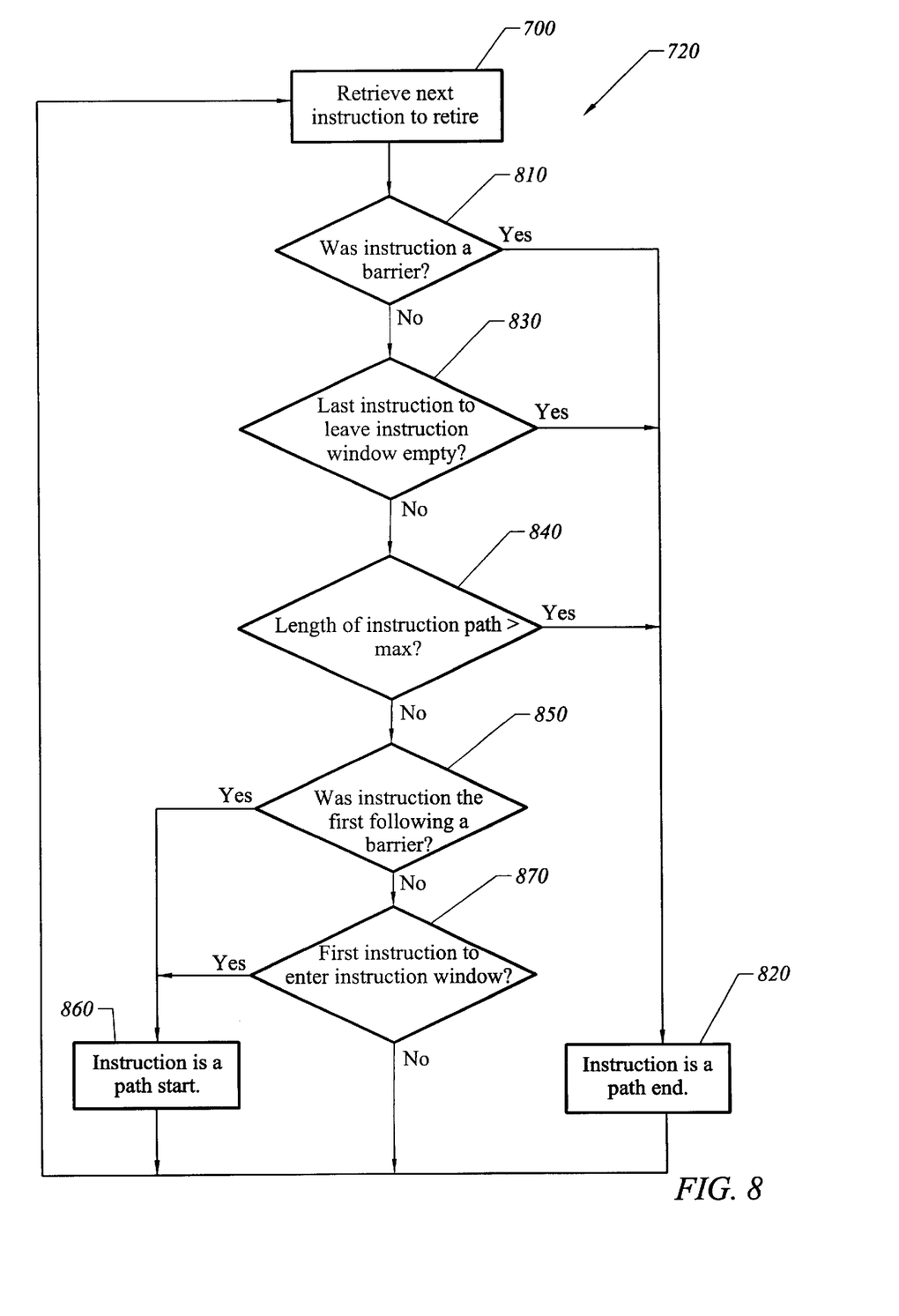
FIG. 8 is a flow diagram depicting a method of determining paths.

Referring now to FIG. 8, step 700 of FIG. 7 wherein the next instruction is retrieved is repeated for clarity. In step

810, path routine 720 determines if the instruction is a barrier instruction by comparing the instruction's ID with the various barrier variables. If it is a barrier instruction, then in step 820, the instruction is determined to be a path end, and path routine 720 is complete.

If the instruction is not a path end, in step 830 it is determined if the instruction is the last instruction in the list, thereby leaving the instruction window empty. If so, then the instruction is also a path end. Similarly, step 840 compares the length of the instruction path so far, against the maximum instruction path length. If it is at the maximum, then the path is a path end. In the specific embodiment, the maximum path length is 1,024 instructions.

Step 850 examines the instruction to determine if it is the first following a barrier instruction. If it is, then in step 860 the instruction is determined to be a path start. If it is not, then in step 870, path routine 720 determines if it is the first instruction to enter the instruction window. If so, it is also determined to be a path start. Otherwise, it is not a path start or a path end, and the instruction is added to the path that has not yet received a path end. Path routine 720 then repeats for the next instruction.

Referring again to FIG. 7, the next step 730 determines if the instruction is a path end instruction. If it is not a path end instruction, then no other action is taken and the next instruction is retrieved in step 700. If it is a path end, then in step 740 Path_ID is calculated as defined above to be the address of the start path instruction concatenated with a leading "1" and bits indicating the taken status of branches. Another useful statistic that may be calculated in step 840 is the number of cycles that were spent in executing the path.

In step 850, the information calculated in step 840 is inserted into the path hash table. The path hash table is a software construct for storing the path information. The generation and manipulation of a hash table is known to those of skill in the art.

The path hash table stores all the information collected during the execution of the dynamic trace rescheduler. Using the path hash table, path rankings 240 and other statistics 250 are generated.

Using the routines above and the information gathered during their execution, statistical information may be gathered and compiled as is well known in the art. Statistics about the paths are included in a path hash table, the generation of which is well known in the art. Statistics may include the number of hoisted instructions, the cumulative percentage of hoisted instructions, path encounters, cycles spent (i.e., the actual number of time to execute the path,) number of cycles saved by hoisting, numbers of load-past-store hoistings, and other possible statistics of interest. Path rankings 240 may be determined based on the above criteria, or other criteria established by the user.

Other statistics 250 may also be compiled as necessary for the user's purpose. For example, different programs may be executed with various criteria for the branch instructions. The statistics generated by the invention may be used by the compiler or the user to determine the most effective compiling strategy for a particular type of program, or a particular machine. Another example is to generate statistics and ranking of culprit loads with store collisions during load-past-store hoistings (memory disambiguation). Another variation is to generate histograms of the number of stores passed by a load hoisting, to help optimize the size of a memory disambiguation buffer to put in the processor.

Of course, it will be recognized by one of skill in the art, that minor variations may be made to the invention that do not depart from the spirit and scope of the invention. For example, the various routines may be combined, executed in a different order, or slightly changed. The above discussion is intended to describe a particular embodiment and is not intended to limit the invention. The invention is to be limited only by reference to the attached claims.

What is claimed is:

1. A method of scheduling instructions for execution on a processor, comprising:

providing a list of instructions with an initial execution order with early instructions scheduled to execute before later instructions;

defining a subset of the instructions as barrier instructions;

hoisting an instruction to an earlier position in the list of instructions, wherein the barrier instructions determine how early in the instruction list an instruction can be hoisted;

maintaining a count of the number of registers needed to execute the list of instructions;

determining whether hoisting the instruction will cause the count to exceed a predetermined register number; and if hoisting the instruction will exceed the predetermined register number, including the instruction in the subset of barrier instructions.

2. The method of claim 1, wherein the subset of barrier instructions include branch instructions.

3. The method of claim 2, wherein some branch instructions are not included in the subset of barrier instructions.

4. The method of claim 1, wherein the subset of barrier instructions include load instructions and store instructions.

5. The method of claim 1, further comprising generating a recorded list of instructions.

6. The method of claim 1, further comprising:

simulating execution of the instructions in the initial execution order;

identifying a stalled instruction that is not ready for execution; and hoisting a later instruction ahead of the stalled instruction.

7. A method of reordering instructions for execution on a processor comprising:

providing a dynamic instruction trace;

identifying some of the instructions in the dynamic instruction trace as barrier instructions;

simulating the execution of the dynamic instruction trace;

determining an instruction in the dynamic instruction trace that will cause the processor to stall; and hoisting a later instruction above the stalled instruction forming a reordered instruction trace, wherein the later instruction is not raised above the barrier instruction.

8. The method of claim 7, further comprising:

identifying load instructions as barrier instructions;

identifying store instructions as barrier instructions; and identifying branch instructions as barrier instruction.

9. The method of claim 7, further comprising:

identifying all branch instructions as barrier instructions.

10. The method of claim 7, further comprising:

identifying a mispredicted static branch instruction as a barrier instruction; and identifying a mispredicted dynamic branch instruction as a barrier instruction.

11. The method of claim 7, further comprising:

identifying a mispredicted dynamic branch instruction as a barrier instruction.

12. The method of claim 7, further comprising:

maintaining a count of registers needed for execution at a given point in time; and identifying instructions that cause the count to exceed a predetermined maximum value as a barrier instruction.

13. The method of claim 7, further comprising:

separating the reordered instruction trace into a plurality of paths, wherein each of the paths has at most one barrier instruction; and compiling statistics regarding the plurality of paths.

14. The method of claim 13, further comprising:

inputting the statistics to a compiler for optimization of a computer program.

15. A method of reordering instructions for execution on a processor comprising:

providing a dynamic instruction trace;

identifying store instructions as barrier instructions;

identifying branch instructions as barrier instruction;

maintaining a count of registers needed for execution at a given point in time; and identifying instructions that cause the count to exceed a predetermined maximum value as a barrier instruction.

simulating the execution of the dynamic instruction trace;

determining an instruction in the dynamic instruction trace that will cause the processor to stall; and hoisting a later instruction above the stalled instruction forming a reordered instruction trace, wherein the later instruction is not raised above the barrier instructions.

16. A computer program product for execution on a computer system, comprising:

code for providing a list of instructions with an initial execution order with early instructions scheduled to execute before later instructions;

code for defining a subset of the instructions as barrier instructions;

code for hoisting an instruction to an earlier position in the list of instructions, wherein the barrier instructions determine how early in the instruction list an instruction can be hoisted;

code for maintaining a count of the number of registers needed to execute the list of instructions;

code for determining whether hoisting the instruction will cause the count to exceed a predetermined register number; and if hoisting the instruction will exceed the predetermined register number, including the instruction in the subset of barrier instructions.

17. A computer system comprising:

a processor for executing instructions;

a bus coupled to the processor;

a memory coupled to the bus;

a computer program stored in the memory, the computer program comprising:

code for providing a list of instructions with an initial execution order with early instructions scheduled to execute before later instructions;

code for defining a subset of the instructions as barrier instructions;

code for hoisting an instruction to an earlier position in the list of instructions, wherein the barrier instructions determine how early in the instruction list an instruction can be hoisted;

code for maintaining a count of the number of registers needed to execute the list of instructions;

code for determining whether hoisting the instruction will cause the count to exceed a predetermined register number; and if hoisting the instruction will exceed the predetermined register number, including the instruction in the subset of barrier instructions.

* * * * *